R. WRIGHT,

Assignor to G. BERGEN.

Easel Picture Frame.

No. 9,281. Reissued July 6, 1880.

*Witnesses*

John C. Tumbridge

Harry M. Park.

*Inventor:*

Rufus Wright by his attorney

Aug. Briesen

UNITED STATES PATENT OFFICE.

RUFUS WRIGHT, OF BROOKLYN, N. Y., ASSIGNOR TO GARRET BERGEN.

EASEL PICTURE-FRAME.

SPECIFICATION forming part of Reissued Letters Patent No. 9,281, dated July 6, 1880.

Original No. 117,133, dated July 18, 1871. Application for reissue filed April 15, 1880.

*To all whom it may concern:*

Be it known that I, RUFUS WRIGHT, of Brooklyn, in the county of Kings and State of New York, have invented a new and Improved Easel Picture-Frame, of which the following is a specification.

This invention relates to an improvement in frames for holding photographs and other pictures, having special reference to self-supporting or what are known as "easel" frames.

The invention consists in making the frame and supporting-brace of a single piece or plate of material; second, in a brace for the main or supporting brace in one piece with the frame and main brace; also, in cutting slots into the frame or stand for holding the picture.

Figure 1:
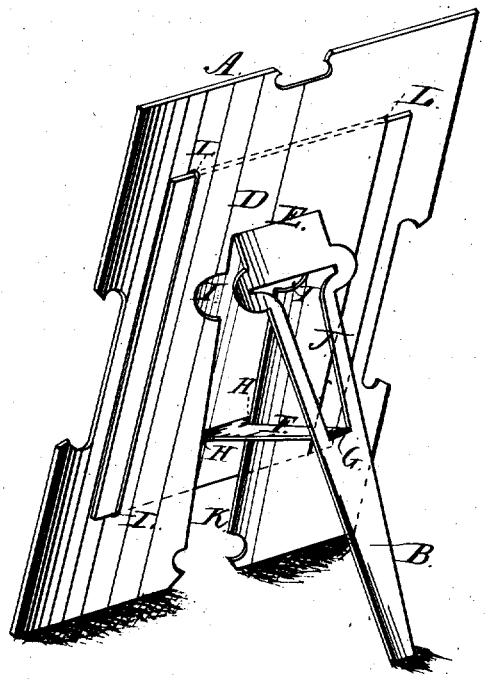
Figure 2:
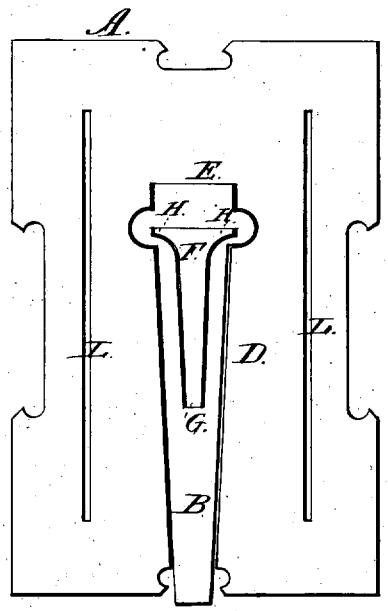

In the accompanying drawings, Figure 1 represents a perspective view of my improved frame, and Fig. 2 represents a back view of the same.

Referring to the drawings, A represents the frame, which may be made of card-board, paper, leather, metal, or any other suitable material that is readily cut in the required manner. When the frame is made of card or paste board, paper, or similar material, it may on the back be covered with cloth, leather, or any tough and flexible material, and made fast thereto with glue or other adhesive substance.

B represents the main brace or support, which is cut from the frame or plate A. This brace B swings from the point E as on a hinge, so that the lower end can be swung out to support the frame in inclined position, as represented in Fig. 1.

F represents a second brace, which is cut from the main brace B, and swings from the point G as on a hinge. The end of this brace F has projecting lugs H H, which are readily inserted through the wider part of the slot K behind the picture, and which take hold of the sides of that portion of the plate or frame A from which the stand B has been cut, as seen in Fig. 1.

The brace B and the brace F hold the frame in place and allow it to be moved or handled without deranging the angles; but by raising up the end of the brace F into the broader part I of the space K, from which the brace B is cut, it is readily detached, and will fold into the open space J in B, from which it is taken. The brace or support B will also drop naturally into the space K, from whence it is taken, so that the frame with the picture will form a flat surface for packing and transportation.

L L are parallel slots cut through the plate for the insertion of the picture, the portion D of the frame between said slots nearly covering the back of the picture.

The frame may be made without the brace F, and I do not confine myself to that feature, nor to any device for keeping the brace B at a proper angle.

It will be seen that the brace is stiff when in use and extends above the lower half of the frame A.

I claim—

1. The frame A, the brace or support B, formed from the frame A, and the brace F, formed from the brace B, all made in a single piece, substantially as herein shown and described.

2. The frame A, provided with open parallel slots L L, for receiving and supporting the picture, substantially as herein shown and described.

RUFUS WRIGHT.

Witnesses:
A. V. BRIESEN,
GARRET BERGEN.